United States Patent
Chen (10) Patent No.: US 10,710,810 B2
(45) Date of Patent: Jul. 14, 2020

(54) O-RING AND CONVEYANCE APPARATUS

(71) Applicants: HKC CORPORATION LIMITED, Shenzhen, Guangdong (CN); CHONGQING HKC OPTOELECTRONICS TECHNOLOGY CO., LTD., Chongqing (CN)

(72) Inventor: Kai Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/313,018

(22) PCT Filed: Nov. 22, 2018

(86) PCT No.: PCT/CN2018/116852
§ 371 (c)(1),
(2) Date: Dec. 22, 2018

(87) PCT Pub. No.: WO2020/042391
PCT Pub. Date: Mar. 5, 2020

(65) Prior Publication Data
US 2020/0062511 A1    Feb. 27, 2020

(30) Foreign Application Priority Data
Aug. 27, 2018   (CN) .................... 2018 2 1390369 U (51) Int. Cl.
*B65G 39/07*    (2006.01)

(52) U.S. Cl.
CPC ........ *B65G 39/07* (2013.01); *B65G 2201/022* (2013.01); *B65G 2249/00* (2013.01)

(58) Field of Classification Search
CPC .............. B65G 39/07; B65G 2201/022; B65G 2249/00
USPC ....................................................... 198/780
See application file for complete search history.

(56) References Cited

U.S. PATENT DOCUMENTS

2009/0133523 A1*   5/2009   Song ................... F16H 25/2247
                                                   74/424.82
2018/0222679 A1*   8/2018   Iwasaka ................... B25J 15/06

FOREIGN PATENT DOCUMENTS

JP            2008119      *   1/1990

* cited by examiner

*Primary Examiner* — Gene O Crawford
*Assistant Examiner* — Lester Rushin, III (57) ABSTRACT

An O-ring and a conveyance apparatus are provided. The O-ring includes an O-ring body having an annular shape. The O-ring further includes a plurality of protrusions arranged at intervals on an outer annular surface of the O-ring body and configured to support a glass substrate and convey the glass substrate as the O-ring body rotates, so that a total area of contact between the glass substrate and the O-ring is reduced, thereby reducing a print area. In addition, after the protrusions and the glass substrate come into contact, contact marks are in a discontinuous state or, in other words, are in a spaced state, and prints are also discontinuous or spaced prints, thereby mitigating visual effects of the prints, and eliminating the prints at low costs.

16 Claims, 6 Drawing Sheets

O-RING AND CONVEYANCE APPARATUS

BACKGROUND

This application claims priority to Chinese Patent Application No. 201821390369.8, filed with the Chinese Patent Office on Aug. 27, 2018 and entitled "O-RING", which is incorporated herein by reference in its entirety.

TECHNICAL FIELD

This application relates to the technical field of conveyance equipment, and in particular, to an O-ring and a conveyance apparatus.

RELATED ART

The description herein provides only background information related to this application, but does not necessarily constitute the existing technology. A working procedure used in the production of a thin-film-transistor liquid-crystal display (TFT-LCD) is conveyance of a glass substrate by using a conveyance apparatus. During conveyance, the TFT-LCD is placed on an O-ring. The TFT-LCD is in contact with the O-ring and is actuated by the O-ring to implement conveyance. The O-ring gathers dirt and dust easily. The TFT-LCD needs to be in contact with the O-ring. As a result, a ring mark is inevitably left during the conveyance of the TFT-LCD. To deal with a ring mark left on the TFT-LCD, common approaches are improving a cleanroom grade of a workshop and increasing the frequency of maintaining and cleaning the conveyance apparatus and the O-ring, to eliminate or reduce the probability that a ring mark occurs. However, the improvement of the cleanroom grade of the workshop requires higher workshop maintenance costs, resulting in increased production costs. In addition, the number of times of maintaining and cleaning the conveyance apparatus and the O-ring is increased, also resulting in increased production costs.

SUMMARY

An objective of the application is to provide an O-ring, including but not limited to eliminate a ring mark and control production costs.

A technical solution used in embodiments of this application is as follows: An O-ring is provided, and the O-ring includes:

an O-ring body, having an annular shape; and a plurality of protrusions, arranged at intervals on an outer annular surface of the O-ring body, and configured to support a glass substrate and convey the glass substrate as the O-ring body rotates.

In an embodiment, each protrusion is a cylindrical protrusion, and a lateral surface in a radial direction of the cylindrical protrusion is fixedly connected to the O-ring body.

In an embodiment, a first central line in an axial direction of the cylindrical protrusion is parallel to a second central line in an axial direction of the O-ring body.

In an embodiment, a first central line in an axial direction of the cylindrical protrusion is parallel to a tangent surface in a corresponding position on the O-ring body and is set at an angle from a second central line in an axial direction of the O-ring body.

In an embodiment, the angle ranges from 5° to 20°.

In an embodiment, the angle ranges from 10° to 15°.

In an embodiment, the protrusion is a hemispheric protrusion.

In an embodiment, the protrusions are disposed along the outer annular surface of the O-ring body, and the protrusions are arranged into at least one circle.

In an embodiment, the protrusions are arranged into two or more circles, and the protrusions in the circles are disposed in parallel.

In an embodiment, the protrusions are arranged into two or more circles, and the protrusions in the circles are disposed in a staggered manner.

In an embodiment, a cross section of the O-ring body has a circular shape or has a rectangular shape.

In an embodiment, the O-ring body and the protrusions are integrally formed.

In an embodiment, the O-ring body and the protrusions are integrally formed in an injection molding manner.

In an embodiment, a plurality of grooves that correspond one-to-one to the protrusions are arranged at intervals on the outer annular surface of the O-ring body, and the protrusions are inserted in the corresponding grooves.

In an embodiment, the O-ring body is made of a rubber material.

In an embodiment, the protrusion is made of a rubber material.

Another objective of this application is to provide an O-ring, including:

an O-ring body, having an annular shape; and a plurality of protrusions, arranged at intervals on an outer annular surface of the O-ring body, and configured to support a glass substrate and convey the glass substrate as the O-ring body rotates, where each protrusion is a cylindrical protrusion, and a lateral surface in a radial direction of the cylindrical protrusion is fixedly connected to the O-ring body;

a first central line in an axial direction of the cylindrical protrusion is parallel to a tangent surface in a corresponding position on the O-ring body and is set at an angle from a second central line in an axial direction of the O-ring body, and the angle ranges from 5° to 20°;

a cross section of the O-ring body has a circular shape or has a rectangular shape; and the O-ring body and the cylindrical protrusions are integrally formed.

Still another objective of this application is to provide a conveyance apparatus, including:

a plurality of roller shafts, disposed in a conveyance direction, each roller shaft being sheathed with a plurality of O-rings, where the O-ring includes an O-ring body having an annular shape; and the O-ring further includes a plurality of protrusions arranged at intervals on an outer annular surface of the O-ring body and configured to support a glass substrate and convey the glass substrate as the O-ring body rotates.

In an embodiment, a plurality of rollers is disposed on each roller shaft, an annular groove is provided on an outer circumferential surface of each roller, the O-rings correspond one-to-one to the rollers, and each O-ring is sleeved over the annular groove of the corresponding roller.

For the O-ring provided in the embodiments of this application, several protrusions are disposed on an outer annular surface of an O-ring body. During the conveyance of a glass substrate, the glass substrate is in contact with the protrusions. In this way, a total area of contact between the glass substrate and the O-ring is reduced, thereby reducing a print area. In addition, the several protrusions that are disposed on the outer annular surface of the O-ring body are arranged at intervals, so that after the protrusions and the glass substrate come into contact, contact marks are in a discontinuous state or, in other words, are in a spaced state, and prints are also discontinuous or spaced prints, thereby mitigating visual effects of the prints. Further, the O-ring is structurally improved, and the protrusions are disposed on the O-ring body at very low costs, thereby reducing a print area, mitigating the visual effects of the prints, and eliminating the prints at low costs. For the conveyance apparatus provided in the embodiments of this application, the foregoing O-ring is used on roller shafts of the conveyance apparatus, and the protrusions are disposed on the O-ring body at very low costs, thereby reducing a print area, mitigating the visual effects of the prints, and eliminating the prints at low costs.

BRIEF DESCRIPTION OF THE DRAWINGS

To describe the technical solutions in the embodiments of this application more clearly, the following briefly introduces the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

Details of numerals used in the foregoing accompanying drawings are as follows:

100—O-ring; 1—O-ring body; 11—tangent surface; 12—cross section; 13—groove; L2—second central line; 2—protrusion; a—inner annular surface; b—outer annular surface; 21—cylindrical protrusion; 211—lateral surface; L1—first central line; 22—hemispheric protrusion; 200—roller shaft; 210—roller; 220—outer circumferential surface; 230—annular groove; and 300—glass substrate.

DETAILED DESCRIPTION

To make the objectives, technical solutions, and advantages of this application clearer and more comprehensible, the following further describes this application in detail with reference to the accompanying drawings and embodiments.

It should be understood that the specific embodiments described herein are merely used to explain this application but are not intended to limit this application.

It should be noted that when an element is referred to as being "fixed" to or "disposed" on another element, it can be directly fixed to or disposed on the other element or intervening elements may also be present. When an element is referred to as being "coupled" or "connected" to another element, it can be directly or indirectly coupled or connected to the other element. Orientation or position relationships indicated by the terms such as "on", "below", "left", and "right" are based on orientation or position relationships shown in the accompanying drawings, and are used only for ease of illustration description, rather than indicating or implying that the mentioned apparatus or component must have a particular orientation or must be constructed and operated in a particular orientation. Therefore, such terms should not be construed as limiting of this patent. Persons of ordinary skill in the art can understand the specific meaning of these terms according to specific situations. The terms such as "first" and "second" are used only for the purpose of description, and should not be understood as indicating or implying the relative importance or implicitly specifying the number of the indicated technical features. Unless otherwise particularly defined, "a plurality of" means two or more than two.

The technical solutions of this application are described in detail below with reference to the specific accompanying drawings and embodiments.

Figure 1:
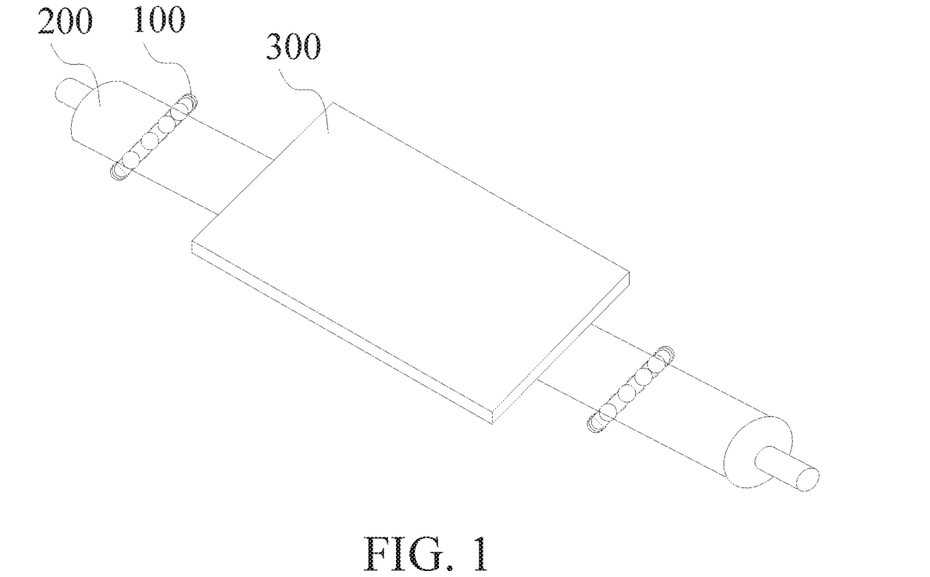
FIG. 1 is a schematic structural diagram of a conveyance apparatus according to an embodiment of this application.
Figure 2:
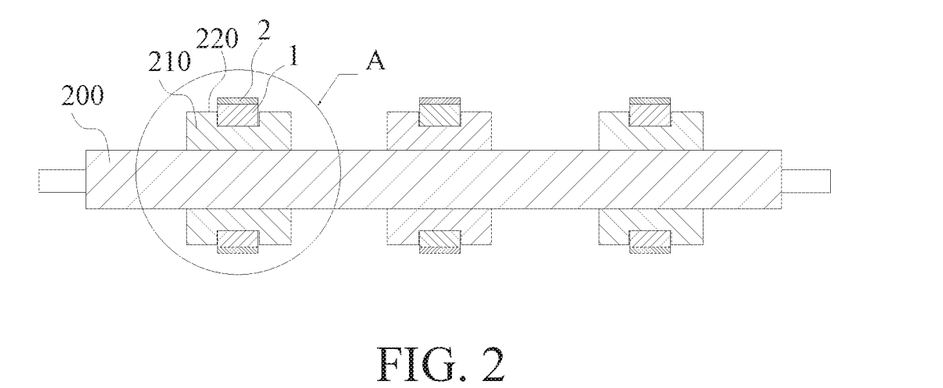
FIG. 2 is a schematic sectional view of a conveyance apparatus according to an embodiment of this application.
Figure 3:
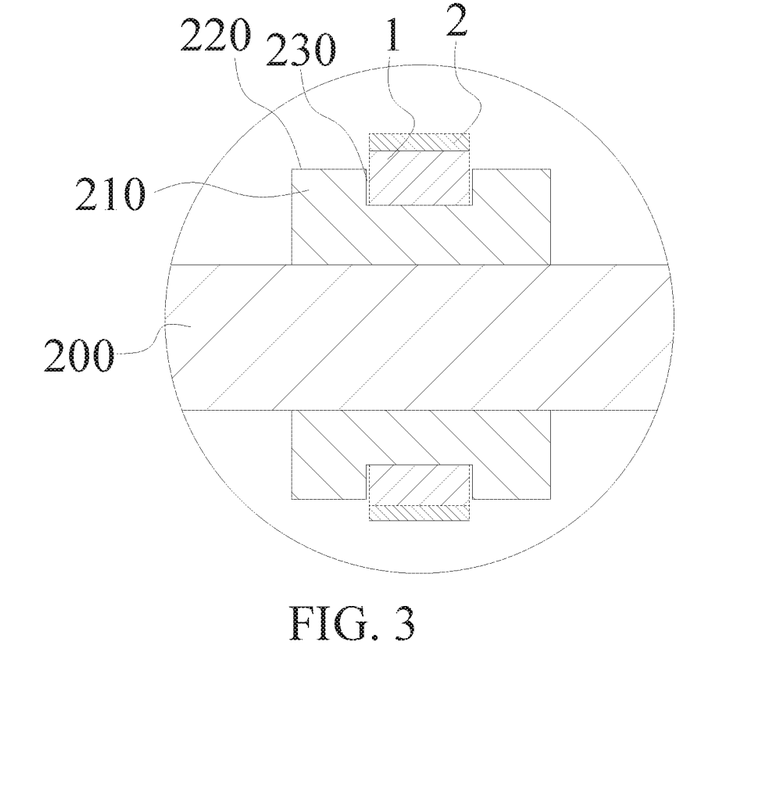
FIG. 3 is an enlarged view of a region A in FIG. 2.

Referring to FIG. 1 to FIG. 3, during the production of a high-precision thin-sheet product such as a screen, a glass substrate, and a circuit board, a conveyance apparatus usually needs to be used to convey the thin-sheet product. The conveyance apparatus includes a plurality of roller shafts 200 disposed in a conveyance direction. Each roller shaft 200 is sheathed with a plurality of O-rings 100. The O-rings 100 is used to support the thin-sheet product, and a frictional force between the O-rings 100 and the thin-sheet product is used to actuate the thin-sheet product to move. The conveyance apparatus conveys the thin-sheet product through a cleaning apparatus, an air-drying apparatus, or may even convey the thin-sheet product through a baking apparatus and air-cooling apparatus. A series of apparatuses are used to implement the cleaning and drying of the thin-sheet product. A glass substrate 300 is used as an example below.

Figure 4:
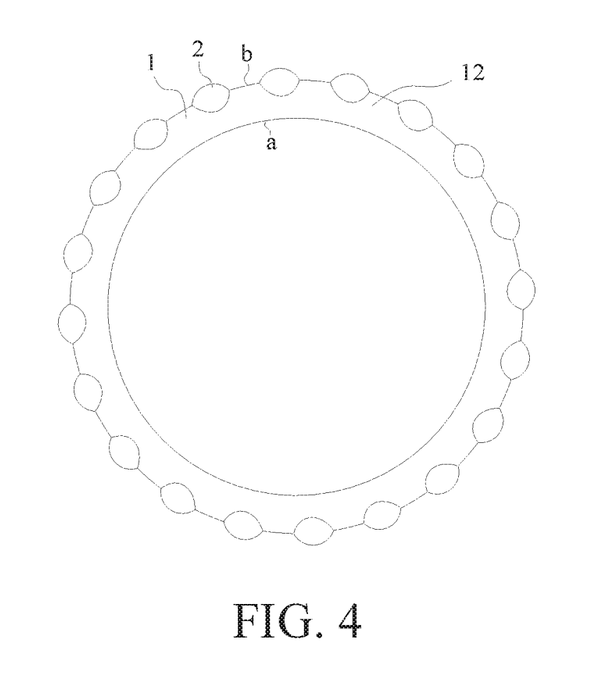
FIG. 4 is a schematic structural diagram of an O-ring according to an embodiment of this application.

Referring to FIG. 4 together, an O-ring 100 provided in an embodiment of this application is applied to a conveyance apparatus. The O-ring 100 includes an O-ring body 1 having an annular shape. The O-ring 100 further includes a plurality of protrusions 2 arranged at intervals along an outer annular surface b of the O-ring body 1. The plurality of protrusions 2 is configured to support a glass substrate 300 and convey the glass substrate 300 as the O-ring body 1 rotates. When the O-ring body 1 is directly used to convey the glass substrate 300, a contact mark between the O-ring body 1 and the glass substrate 300 has a continuous linear shape and a generated print also has a linear shape and can be seen relatively clearly. In this embodiment, because several protrusions 2 are disposed on the outer annular surface b of the O-ring body 1, during the conveyance of the glass substrate 300, the glass substrate 300 is in contact with the protrusions 2. In this way, a total area of contact between the glass substrate 300 and the O-ring 100 is reduced, thereby reducing a print area. In addition, the several protrusions 2 that are disposed on the outer annular surface b of the O-ring body 1 are arranged at intervals, so that after the protrusions 2 and the glass substrate 300 come into contact, contact marks are in a discontinuous state or, in other words, are in a spaced state, and prints are also discontinuous prints or spaced prints, thereby mitigating visual effects of the prints. In this embodiment, the O-ring 100 is structurally improved, and the protrusions 2 are disposed on the O-ring body 1 at very low costs, thereby reducing a print area, mitigating the visual effects of the prints, and eliminating the prints at low costs.

In this embodiment, a surface of a side near the center of the O-ring body 1 is an inner annular surface a, and a surface of a side far away from the center of the O-ring body 1 is the outer annular surface b. The "arranged at intervals" means that the protrusions 2 are arranged at intervals having a particular distance.

Figure 5:
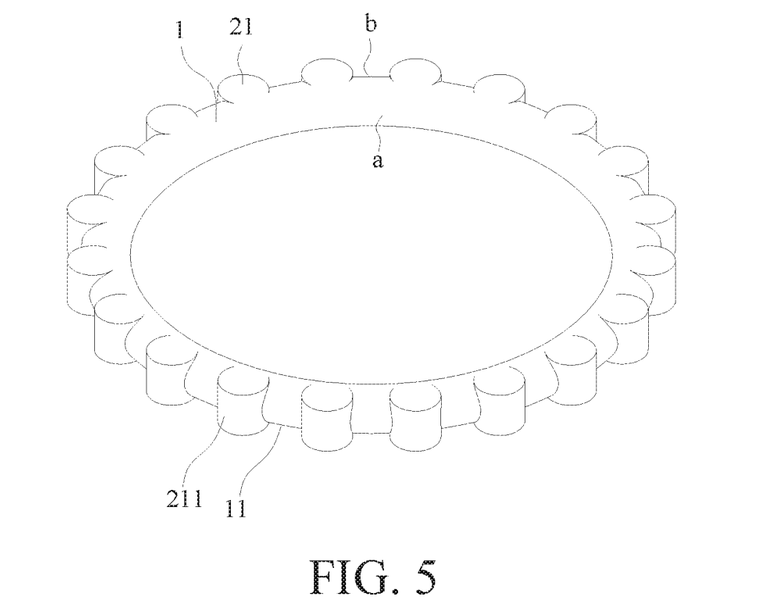
FIG. 5 is a schematic structural diagram of a cylindrical protrusion in an O-ring according to an embodiment of this application.
Figure 6:
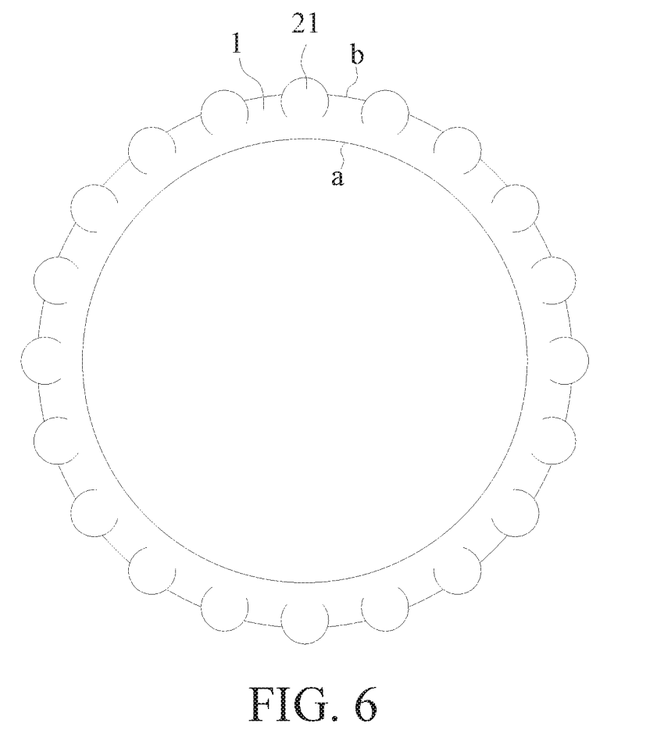
FIG. 6 is a schematic structural diagram of a cylindrical protrusion in an O-ring from another viewing angle according to an embodiment of this application.

In an embodiment, as shown in FIG. 5 and FIG. 6, each protrusion 2 is a cylindrical protrusion 21, and a lateral surface 211 in a radial direction of the cylindrical protrusion 21 is fixedly connected to the O-ring body 1. After the cylindrical protrusion 21 is disposed on the outer annular surface b of the O-ring body 1, because the lateral surface 211 in the radial direction of the cylindrical protrusion 21 is a cylindrical surface, solid particles such as dust that fall on the lateral surface 211 in the radial direction of the cylindrical protrusion 21 slide very easily on the O-ring body 1, so that dust accumulating on the cylindrical protrusion 21 is reduced, thereby mitigating prints, and reducing the clarity of the prints.

Figure 7:
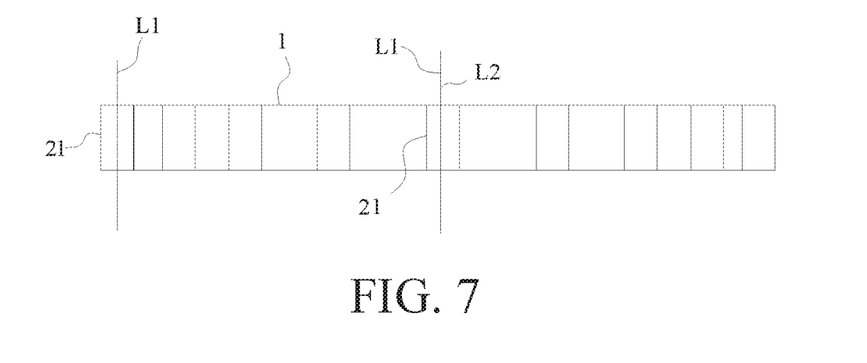
FIG. 7 is a schematic diagram from an angle of a central line of a cylindrical protrusion in an O-ring according to an embodiment of this application.

In an embodiment of this application, as shown in FIG. 6 and FIG. 7, in this embodiment, a first central line L1 in an axial direction of the cylindrical protrusion 21 is parallel to a second central line L2 in an axial direction of the O-ring body 1. When the first central line L1 in the axial direction of the cylindrical protrusion 21 is set in parallel to the second central line L2 in the axial direction of the O-ring body 1, the structure of the cylindrical protrusion 21 becomes simpler, and a total area of contact between the glass substrate 300 and the cylindrical protrusion 21 can be reduced, thereby mitigating prints, and reducing the clarity of the prints.

Figure 8:
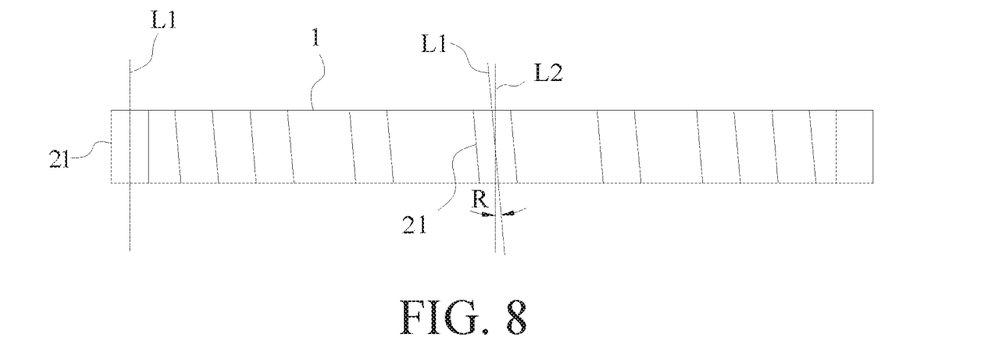
FIG. 8 is a schematic diagram from an angle of a central line of a cylindrical protrusion in an O-ring according to another embodiment of this application.

In another embodiment of this application, as shown in FIG. 8, a first central line L1 in an axial direction of the cylindrical protrusion 21 is parallel to a tangent surface 11 in a corresponding position on the O-ring body 1, and the first central line L1 in the axial direction of the cylindrical protrusion 21 is set at an angle R from a second central line L2 in an axial direction of the O-ring body 1. During the cleaning of a glass substrate, a cleaning nozzle needs to be used to spray a cleaning liquid on the glass substrate. During the air drying of the glass substrate, an air-drying nozzle needs to be used to spray air to the glass substrate. When the cleaning nozzle and the air-drying nozzle are projected onto a conveyance surface for conveying the glass substrate, the cleaning nozzle and the air-drying nozzle are separately at a particular angle from a conveyance direction. In this embodiment, when the first central line L1 in the axial direction of the cylindrical protrusion 21 is set at the angle R from the second central line L2 in the axial direction of the O-ring body 1, facing directions of gaps between the cylindrical protrusions 21 may be aligned with facing directions of the cleaning nozzle and the air-drying nozzle, thereby improving a cleaning effect of the cleaning nozzle on the gaps between the cylindrical protrusions 21, and improving an air-drying effect of the air-drying nozzle on the gaps between the cylindrical protrusions 21. Specifically, in an embodiment of this application, the range of the angle R is 5° to 20°, so that the cleaning nozzle has a more desirable cleaning effect and the air-drying nozzle has a more desirable air-drying effect.

In an embodiment of this application, the range of the foregoing angle R is 10° to 15°. The angle R is set to 10° to 15°, so that the cleaning nozzle and the air-drying nozzle have more desirable facing directions and can better perform cleaning and air drying of the gaps between the cylindrical protrusions 21. For example, the angle R may be 10°, 12°, 15° or the like.

Figure 9:
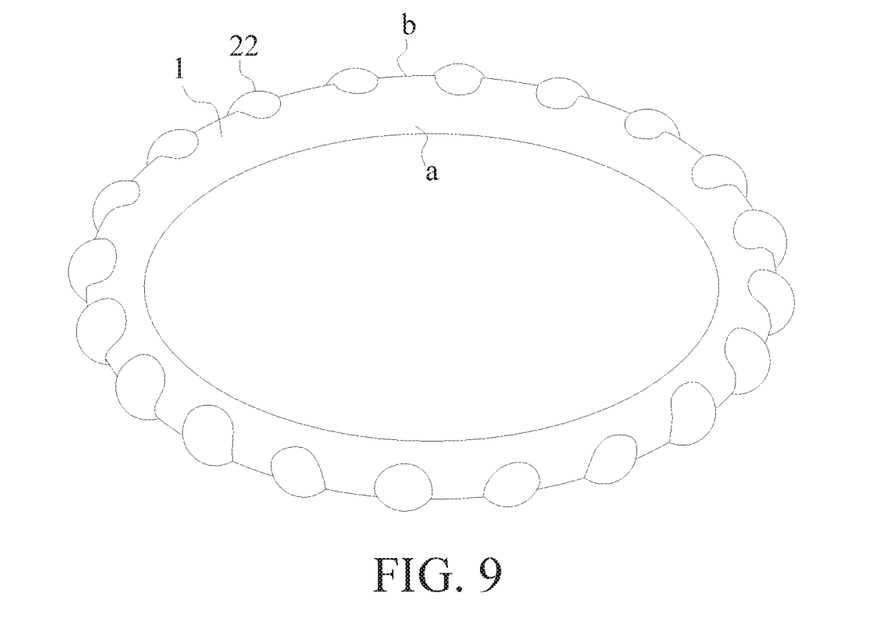
FIG. 9 is a schematic structural diagram of a hemispheric protrusion in an O-ring according to still another embodiment of this application.

In still another embodiment of this application, as shown in FIG. 9, each protrusion 2 is a hemispheric protrusion 22. Contact positions between the protrusion 2 and the glass substrate 300 are points that are disposed at intervals. After the hemispheric protrusions 22 are disposed on the outer annular surface b of the O-ring body 1, during the conveyance of the glass substrate 300, areas of contact between the glass substrate 300 and the hemispheric protrusions 22 have a dot form, and a total area of contact between the glass substrate 300 and the hemispheric protrusions 22 is reduced, so that areas of prints are reduced, making the prints hardly noticeable. In addition, when the hemispheric protrusions 22 are disposed on the outer annular surface b of the O-ring body 1 for contact with the glass substrate 300, contact marks are in a discontinuous state or, in other words, are in a spaced state, and prints are also discontinuous or spaced prints, thereby further mitigating visual effects of the prints, so that the prints become hardly noticeable.

In addition, after the hemispheric protrusion 22 is disposed on the outer annular surface b of the O-ring body 1, because the surface of the hemispheric protrusion 22 is a spherical surface, solid particles such as dust that fall on the surface of the hemispheric protrusion 22 slide very easily on the O-ring body 1, so that dust accumulating on the hemispheric protrusion 22 is reduced, thereby mitigating prints, and reducing the clarity of the prints.

In an embodiment, as shown in FIG. 4, the diameter of the hemispheric protrusion 22 is less than or equal to the thickness of the O-ring body 1. In this embodiment, the thickness of the O-ring body 1 is a size in a direction of a central line of the O-ring body 1. Specifically, when a cross section 12 of the O-ring body 1 has a circular shape, the diameter of the hemispheric protrusion 22 is less than or equal to the diameter of the cross section 12 of the O-ring body 1.

In an embodiment, the protrusions 2 are arranged on the outer annular surface b of the O-ring body 1, and the protrusions 2 are arranged into at least one circle, to better support the glass substrate 300. Specifically, the protrusions 2 may be arranged into one circle, two circles, three circles or four circles. Certainly, a larger number of circles may further be set in this implementation according to an actual requirement.

In an embodiment, when the protrusions are arranged into two or more circles, the protrusions in each circle are disposed in parallel and at intervals. In this embodiment, two circles are used as an example for description. Two circles of protrusions 2 are disposed on the O-ring body 1 in this embodiment, thereby reducing the pressure on the protrusions 2 and preventing the protrusions 2 from collapsing, to prevent the glass substrate 300 from contacting the O-ring body 1. In addition, an abutting area between a single protrusion 2 and the glass substrate 300 is reduced, a print of the single protrusion 2 has a reduced size, and a visual effect of the print is mitigated.

In another embodiment, when the protrusions are arranged into two or more circles, the protrusions 2 in the circles are disposed in a staggered manner, so that the protrusions 2 have a larger arrangement space to facilitate the arrangement of the circles of the protrusions 2.

In an embodiment, the cross section 12 of the O-ring body 1 has a circular shape. The cross section 12 having the circular shape further facilitates the conveyance of the glass substrate 300, and areas of prints are reduced. In another embodiment of the O-ring body 1, the cross section 12 of the O-ring body 1 may further have a rectangular shape.

In an embodiment, the O-ring body 1 and the protrusions 2 are made of a rubber material. The protrusions 2 on the O-ring body 1 actuate the glass substrate 300 to move by using a frictional force, have elasticity, and cause no damage to the glass substrate 300.

Figure 10:
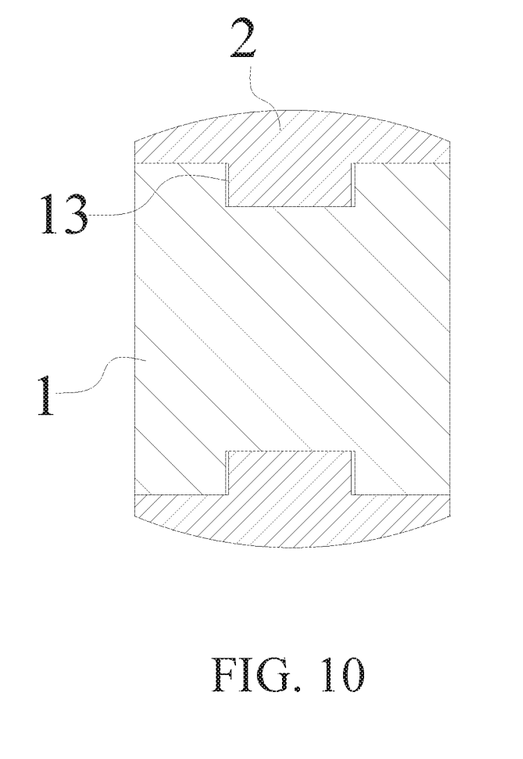
FIG. 10 is a schematic sectional view of an O-ring according to still another embodiment of this application.

In an embodiment, as shown in FIG. 10, each protrusion 2 is a structure additionally disposed on the O-ring body 1. For example, a plurality of grooves 13 that correspond one-to-one to the protrusions 2 are arranged at intervals on the outer annular surface b of the O-ring body 1, and the protrusions 2 are inserted in the corresponding grooves 13. The groove 13 is provided to enable the protrusions 2 to be stably connected to the O-ring body 1, so that the connection is more secure and reliable.

In another embodiment, the protrusions 2 and the O-ring body 1 may further be integrated. By using integrated connection, the protrusions 2 are prevented from being separated from the O-ring body 1 by an external force. Specifically, the protrusions 2 and the O-ring body 1 are integrally formed in an injection molding manner, and therefore have a simple structure and are convenient to process.

Referring to FIG. 1 to FIG. 6 and FIG. 8, an embodiment of this application further provides an O-ring 100, including an O-ring body 1 having an annular shape. The O-ring 100 further includes a plurality of protrusions 2 arranged at intervals along an outer annular surface b of the O-ring body 1. The plurality of protrusions 2 is configured to support a glass substrate 300 and convey the glass substrate 300 as the O-ring body 1 rotates. Each protrusion 2 is a cylindrical protrusion 21, and a lateral surface 211 in a radial direction of the cylindrical protrusion 21 is fixedly connected to the O-ring body 1. A first central line L1 in an axial direction of the cylindrical protrusion 21 is parallel to the tangent surface 11 in a corresponding position on the O-ring body 1 and is set at an angle R from a second central line L2 in an axial direction of the O-ring body 1, and the range of the angle R is 5° to 20°. The cross section 12 of the O-ring body 1 has a circular shape or has a rectangular shape. The O-ring body 1 and the cylindrical protrusions 21 are integrally formed.

In the O-ring 100 in this embodiment, when the O-ring body 1 is directly used to convey the glass substrate 300, a contact mark between the O-ring body 1 and the glass substrate 300 has a continuous linear shape, and a generated print also has a linear shape and can be seen relatively clearly. In this embodiment, because several protrusions 2 are disposed on the outer annular surface b of the O-ring body 1, during the conveyance of the glass substrate 300, the glass substrate 300 is in contact with the protrusions 2. In this way, a total area of contact between the glass substrate 300 and the O-ring 100 is reduced, thereby reducing a print area. In addition, the several protrusions 2 that are disposed on the outer annular surface b of the O-ring body 1 are arranged at intervals, so that after the protrusions 2 and the glass substrate 300 come into contact, contact marks are in a discontinuous state or, in other words, are in a spaced state, and prints are also discontinuous prints or spaced prints, thereby mitigating visual effects of the prints. In this embodiment, the O-ring 100 is structurally improved, and the protrusions 2 are disposed on the O-ring body 1 at very low costs, thereby reducing a print area, mitigating the visual effects of the prints, and eliminating the prints at low costs. In addition, a first central line L1 in an axial direction of the cylindrical protrusion 21 is parallel to a tangent surface 11 in a corresponding position on the O-ring body 1, and the first central line L1 in the axial direction of the cylindrical protrusion 21 is set at an angle from a second central line L2 in an axial direction of the O-ring body 1. During the cleaning of a glass substrate, a cleaning nozzle needs to be used to spray a cleaning liquid on the glass substrate. During the air drying of the glass substrate, an air-drying nozzle needs to be used to spray air to the glass substrate. When the cleaning nozzle and the air-drying nozzle are projected onto a conveyance surface for conveying the glass substrate, the cleaning nozzle and the air-drying nozzle are separately at a particular angle from a conveyance direction. In this embodiment, when the first central line L1 in the axial direction of the cylindrical protrusion 21 is set at the angle R from the second central line L2 in the axial direction of the O-ring body 1, facing directions of gaps between the cylindrical protrusions 21 may be aligned with facing directions of the cleaning nozzle and the air-drying nozzle, thereby improving a cleaning effect of the cleaning nozzle on the gaps between the cylindrical protrusions 21, and improving an air-drying effect of the air-drying nozzle on the gaps between the cylindrical protrusions 21.

Referring to FIG. 1 to FIG. 3, an embodiment of this application further provides a conveyance apparatus, including a plurality of roller shafts 200 disposed in a conveyance direction. Each roller shaft 200 is sheathed with a plurality of O-rings 100 in the foregoing. Each O-ring 100 includes an O-ring body 1 having an annular shape. The O-ring further includes a plurality of protrusions 2 arranged at intervals on an outer annular surface b of the O-ring body 1. The plurality of protrusions 2 is configured to support a glass substrate 300 and convey the glass substrate 300 as the O-ring body 1 rotates.

In the conveyance apparatus in this embodiment, because several protrusions 2 are disposed on the outer annular surface b of the O-ring body 1 on the roller shaft 200, during the conveyance of the glass substrate 300, the glass substrate 300 is in contact with the protrusions 2. In this way, a total area of contact between the glass substrate 300 and the O-ring 100 is reduced, thereby reducing a print area. In addition, the several protrusions 2 that are disposed on the outer annular surface b of the O-ring body 1 on the roller shaft 200 are arranged at intervals, so that after the protrusions 2 and the glass substrate 300 come into contact, contact marks are in a discontinuous state or, in other words, are in a spaced state, and prints are also discontinuous or spaced prints, thereby mitigating visual effects of the prints. In the conveyance apparatus in this embodiment, the O-ring 100 is structurally improved, and the protrusions 2 are disposed on the O-ring body 1 at very low costs, thereby reducing a print area, mitigating the visual effects of the prints, and eliminating the prints at low costs.

In an embodiment, referring to FIG. 1 to FIG. 3, a plurality of rollers 210 is disposed on each roller shaft 200. An annular groove 230 is provided on an outer circumferential surface 220 of each roller 210. The O-rings 100 correspond one-to-one to the rollers 210. Each O-ring 100 is sleeved over the annular groove 230 of the corresponding roller 210. The annular grooves 230 are provided on the outer circumferential surface 220 of the rollers 210, and each O-ring 100 is sleeved over the annular groove 230 of the corresponding roller 210, thereby increasing the connection strength between the rollers 210 and the O-rings 100, and the connection reliability is high.

The above descriptions are merely optional embodiments of this application, and are not intended to limit this application. It should be understood by persons skilled in the art that various modifications and variations can be made to this application. Any modification, equivalent replacement, or improvement made without departing from the spirit and principle of this application shall fall within the scope as defined by the appended claims of this application.

What is claimed is:

1. An O-ring, comprising:
an O-ring body, having an annular shape; and
a plurality of protrusions, arranged at intervals on an outer annular surface of the O-ring body, and configured to support a glass substrate and convey the glass substrate as the O-ring body rotates, wherein
each protrusion is a cylindrical protrusion, and a lateral surface in a radial direction of the cylindrical protrusion is fixedly connected to the O-ring body;
a first central line in an axial direction of the cylindrical protrusion is parallel to a tangent surface in a corresponding position on the O-ring body and is set at an angle from a second central line in an axial direction of the O-ring body, and the angle ranges from 50 to 20°;
a cross section of the O-ring body has a circular shape or has a rectangular shape; and
the O-ring body and the cylindrical protrusions are integrally formed.

2. A conveyance apparatus, comprising:
a plurality of roller shafts, disposed in a conveyance direction, each roller shaft being sheathed with a plurality of O-rings, wherein
the O-ring comprises an O-ring body having an annular shape; and
the O-ring further comprises a plurality of protrusions arranged at intervals on an outer annular surface of the O-ring body and configured to support a glass substrate and convey the glass substrate as the O-ring body rotates.

3. The conveyance apparatus according to claim 2, wherein a plurality of rollers is disposed on each roller shaft, an annular groove is provided on an outer circumferential surface of each roller, the O-rings correspond one-to-one to the rollers, and each O-ring is sleeved over the annular groove of the corresponding roller.

4. The O-ring according to claim 1, wherein a first central line in an axial direction of the cylindrical protrusion is parallel to a second central line in an axial direction of the O-ring body.

5. The O-ring according to claim 1, wherein a first central line in an axial direction of the cylindrical protrusion is parallel to a tangent surface in a corresponding position on the O-ring body and is set at an angle from a second central line in an axial direction of the O-ring body.

6. The O-ring according to claim 1, wherein the angle ranges from 100 to 150.

7. The O-ring according to claim 1, wherein the protrusion is a hemispheric protrusion.

8. The O-ring according to claim 7, wherein the protrusions are disposed along the outer annular surface of the O-ring body, and the protrusions are arranged into at least one circle.

9. The O-ring according to claim 8, wherein the protrusions are arranged into two or more circles, and the protrusions in the circles are disposed in parallel.

10. The O-ring according to claim 9, wherein the protrusions are arranged into two or more circles, and the protrusions in the circles are disposed in a staggered manner.

11. The O-ring according to claim 1, wherein a cross section of the O-ring body has a circular shape or has a rectangular shape.

12. The O-ring according to claim 1, wherein the O-ring body and the protrusions are integrally formed.

13. The O-ring according to claim 12, wherein the O-ring body and the protrusions are integrally formed in an injection molding manner.

14. The O-ring according to claim 1, wherein a plurality of grooves that correspond one-to-one to the protrusions are arranged at intervals on the outer annular surface of the O-ring body, and the protrusions are inserted in the corresponding grooves.

15. The O-ring according to claim 1, wherein the O-ring body is made of a rubber material.

16. The O-ring according to claim 1, wherein each protrusion is made of a rubber material.

* * * * *